No. 872,179. PATENTED NOV. 26, 1907.
E. HERRMANN.
PROCESS OF OBTAINING A SOLUBLE GLUTINOUS SUBSTANCE FROM TANG ACID.
APPLICATION FILED MAY 9, 1906.
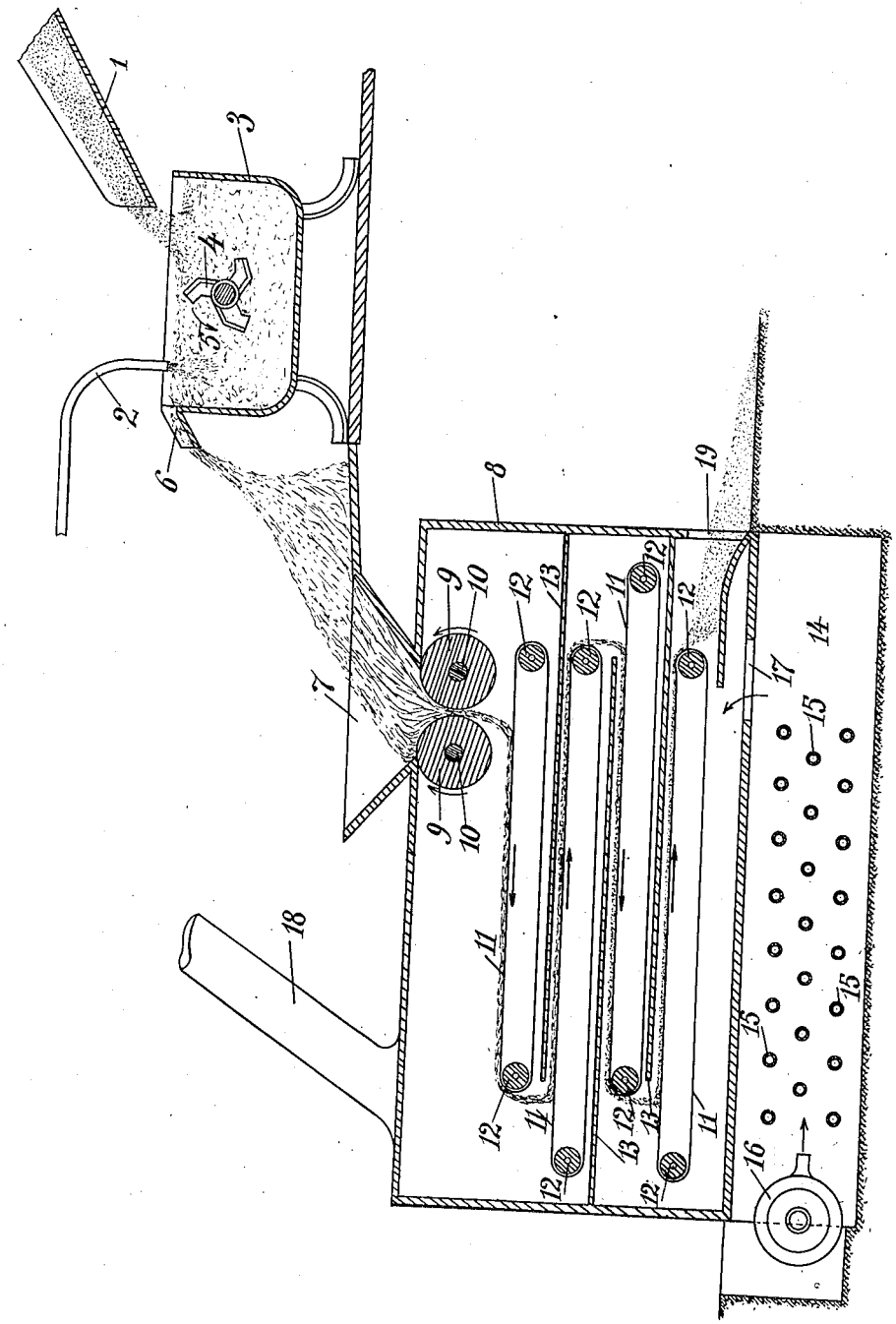
WITNESSES
INVENTOR

UNITED STATES PATENT OFFICE.

ERNEST HERRMANN, OF PARIS, FRANCE, ASSIGNOR TO COMPAGNIE INTERNATIONALE LA NORGINE, OF PARIS, FRANCE.

PROCESS OF OBTAINING A SOLUBLE GLUTINOUS SUBSTANCE FROM TANG-ACID.

No. 872,179.  Specification of Letters Patent.  Patented Nov. 26, 1907.

Application filed May 9, 1906. Serial No. 316,001. (Specimens.)

*To all whom it may concern:*

Be it known that I, ERNEST HERRMANN, a citizen of the Republic of France, residing at Paris, France, 78 Rue d'Anjou, have invented new and useful Improvements in Method of Obtaining a Soluble Glutinous Substance in a Dry and Neutral State from Tang-Acid, of which the following is a specification.

This invention relates to a method of obtaining a soluble glutinous substance in a dry and neutral state from tang-acid.

The method of procedure is as follows:— Tang-acid having been obtained in accordance with the methods already known (see United States Patents No. 598,790 of November 21st 1896 and No. 737,421 of May 19th 1902), either directly from tangate of soda by precipitation with the assistance of an acid or by washing tangate of lime with an acid, is subjected to pressure in a cold state, then heated, either by being plunged into boiling water or by the action of steam, and again pressed. The tang-acid may also be pressed in heated molds. The pressure thus applied to the hot tang-acid enables a far larger quantity of water to be eliminated than by cold process; while the cold pressed tang-acid contains only about 20 per cent of solid products, the hot pressed tang-acid may contain 40 per cent of such products, approximately. The tang-acid may then be pounded without re-agglomerating, whereby it is obtained in the form of powder. The said powder is then subjected to the action of ammonia vapor, either by being arranged in thin layers on an endless band which is carried in the opposite direction to that of the ammonia vapor, or by placing same in apparatus in which it is constantly agitated, such as slowly rotating casks with fixed paddles in the interior, all in communication, so that the whole of the ammonia may be absorbed, thus effecting a methodical treatment of tang-acid with ammonia. The ammonia is obtained either by heating an ammoniacal solution, or preparing ammonia-gas by the action of lime on chlorid or sulfate of ammonia or again on liquid manure.

The combination of the tang-acid with the ammonia is effected very quickly. When the action is complete, the product is dried in a drying-room or drying-stove, the heat of which also serves to deprive it of any excess of ammonia that it may contain. In this manner a glutinous substance is obtained in the form of tangate of ammonia, which is absolutely dry, perfectly neutral and perfectly soluble. Its condition in the form of powder also facilitates its being dissolved, as it previously facilitated its drying.

The accompanying drawing shows in sectional elevation an apparatus for subjecting the powder to the action of ammonia vapors. In this drawing, 1 is a hopper for feeding the tang-acid powder and 2 is a pipe for feeding an ammoniacal solution to the vat 3 in which is mounted a stirrer 4, rotating in the direction of the arrow 5.

The proportion of substances introduced in the vat 3 are as follows:

Tang-acid............... 87 parts of weight.
Ammoniacal solution... 13 "   "   "
                        ———
                        100 "

or approximatively 15% of ammonia.

The stirred mixture of tang-acid and ammonia is discharged through the spout 6 of the vat 5, into a funnel 7 placed at the top of a box 8, containing two rollers 9, rotating on their axles 10, actuated by any convenient means in opposite directions (see arrows) beneath the spout of funnel 7. The box 8 contains a series of superposed endless belts 11, supported by rollers 12 and moving in the direction indicated by arrows, so as to convey the material successively to the discharge of apparatus. 13, 13, are horizontal partitions between the different endless belts. A compartment 14 is disposed beneath the box 8, and this compartment is occupied by steam heating pipes 15, and by a centrifugal blower 16 at one end of the compartment. The heated air passes up through the aperture 17 in the bottom of the box 8 and in meeting the material carried on by the endless belts, the said hot air successively vaporizes the ammonia and dries the material. 18 is a chimney for the escape of the ammonia vapors. Finally the tangate of ammonia is discharged at 19 and it is now ready to be packed up in any convenient manner.

The product is essentially intended to be used for sizing, dressing or finishing textile products.

Having now described my invention, what I claim as new and desire to secure by Letters Patent is:

Process of producing a glutinous substance which shall be dry, neutral and perfectly soluble, by pressing tang-acid while in a heated state, reducing the resulting product to a powder and subjecting it to the action of ammonia vapor or treating it with ammonia gas, drying and at the same time freeing said product from any excess of ammonia which it may contain, substantially in the manner described.

In testimony whereof I have signed my name to this specification in the presence of two subscribing witnesses.

ERNEST HERRMANN.

Witnesses:
   ERIK S. BECKER, Jr.,
   HANSON C. COXE.